RECESSED HINGED BASE STANDARD

Original Filed Jan. 26, 1966 2 Sheets-Sheet 1

INVENTOR.
KENNETH F. GUGGEMOS
BY
Dugger Johnson & Westman
ATTORNEYS

RECESSED HINGED BASE STANDARD

Original Filed Jan. 26, 1966 2 Sheets-Sheet 2

INVENTOR.
KENNETH F. GUGGEMOS
BY
Dugger Johnson & Westman
ATTORNEYS

United States Patent Office

Re. 26,995
Reissued Dec. 1, 1970

26,995
RECESSED HINGED BASE STANDARD

Kenneth F. Guggemos, Winsted, Minn. 55395

Original No. 3,364,635, dated Jan. 23, 1968, Ser. No. 523,148, Jan. 26, 1966. Application for reissue Jan. 22, 1970, Ser. No. 10,671
Int. Cl. F21s *13/10*
U.S. Cl. 52—122 12 Claims

Matter enclosed in heavy brackets [ ] appears in the original patent but forms no part of this reissue specification; matter printed in italics indicates the additions made by reissue.

*ABSTRACT OF THE DISCLOSURE*

*A lighting pole having a recessed hinged base that is mounted substantially flush with the ground or supporting surface. The base permits hinging the light pole down for servicing and also has means for adjusting the pole so it is properly positioned.*

The present invention has relation to lighting standards and more particularly to a hinged base for a lighting standard which is recessed below the surface of the ground to greatly enhance the appearance of the standard and remove the cluttered look associated with the old type bases.

At the present time, the hinged base lighting standard has been increasing in popularity because of the simplicity and which luminaires on the standards can be serviced and replaced. In the modern trend of architecture, however, the accent has been on simplicity and gracefulness. The standards themselves are generally now tubular and can be tapered and formed into curves if desired. This gives very attractive appearance for the standards used around buildings and other places. However, the above ground bases which have previously been available do not lend themselves well to these graceful lines. Further, many architects wish to have lighting standards or poles which appear to "grow" out of the ground, or in other words, have no visible means of attachment to the ground.

In order to combine the advantages of the hinged base with the hidden features of a recessed base, the present device has been advanced. Because the base housings are usually mounted at the time some concrete is poured, the base housings themselves generally are mounted prior to the time that the standards are installed. Therefore means are provided in the present device for plumbing the standards or poles and making them stand upright. Further, with a recessed base, which is flush with the surface of the ground or concrete wall or floor, it is necessary to have some means to waterproof the housing to prevent water from entering the base, shorting out the electrical connections and perhaps even causing corrosion and other damage.

Therefore, it is an object of the present invention to present a hinged base which can be recessed into the ground and which will support a lighting standard or pole.

It is a further object of the present invention to present a hinged base which can be mounted flush with the surface of the ground or supporting structure of a light standard and which has provision for holding the standard in plumb.

It is a still further object of the present invention to present a recessed base which is of sufficient strength to withstand the loads encountered during normal use.

It is another object of the present invention to present a hinged base which has an outer housing that provides space therein for making electrical connections and which permits easy pivoting of the standard to a lowered position for servicing of the light at the top of the standard.

It is another object of the present invention to present a recessed flush mounted hinged base that is completely waterproofed to prevent entry of moisture into the base.

It is a further object to present a recessed pole base that utilizes four anchor bolts and has a housing that can be accurately mounted prior to installing the pole.

Other objects are inherent in the specification and will become apparent as the description proceeds.

Figure 1A:
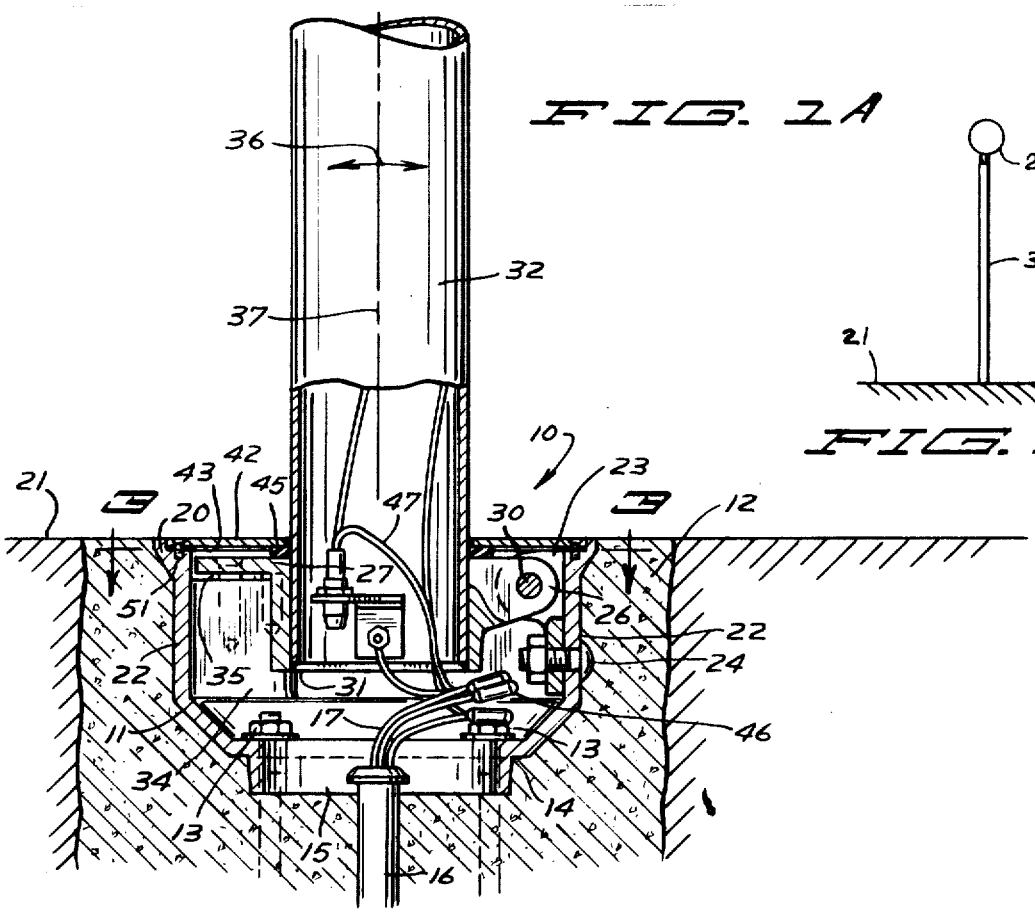
FIG. 1A is a fragmentary vertical sectional view of a recessed hinged base made according to a first form of the present invention and showing the lighting standard in an upright position.

Referring to the drawings and the numerals of reference thereon, a recessed hinged base assembly illustrated generally at 10 includes a main housing 11 which is attached to a concrete foundation illustrated generally at 12, or some other suitable anchor through the use of four mounting anchor bolts 13 which are sunk into the concrete and extend upwardly through a bottom wall 14 of the housing 11. The four anchor or mounting bolts are spaced around the housing, which is square in cross section to provide adequate support for the housing. The bolts are held to the housing with lock nuts on the top and bottom of the bottom wall. The anchor bolts are installed on the housing before the housing is placed in position. The lock nuts hold the bolts properly. The anchor bolts 13 are spaced around the perimeter of the bottom wall, and a center opening 15 is provided in the bottom wall. An underground conduit 16 extends upwardly into the center opening 15 and carries electrical wires illustrated generally at 17 from an electric source (not shown), which is used for lighting the luminaire or light held by the pole. The opening helps in locating the unit directly over the conduit.

As shown, the side walls of the housing 11 taper upwardly from the bottom wall 14 and then extend straight vertically upwardly and terminate along a peripheral flange 20, the top edge of which is flush with the surface 21 of the ground or floor in which the housing is mounted.

On a first of the side walls 22 of the housing, a hinge member 23 is mounted with three bolts illustrated generally at 24. The bolts pass through provided openings in the wall 22 of the housing and extend through openings in the hinge member 23. Suitable nuts are placed on the bolts for tightening the hinge member against the wall 22.

The hinge member 23 has a pair of spaced apart ears 25, 25 which are of size to receive a lug 26 therebetween. The lug 26 is integral with a hinged stanndard or pole support plate 27. A suitable pin 30 is passed through provided aligning openings in the ears 25, 25 and the lug 26 to provide a hinging action for the support plate 27. The hinge pin can be held in place with a set screw in one ear 25 or other suitable device.

The hinged support plate 27 is of size to fit within the four perimeter walls of the housing in a closely spaced relation, and will pivot about the axis of the pin 30. As shown, the support plate 27 has a center hub 31 which is of size to receive a light pole or standard 32 that is welded in place inside the hub 31 and extends upwardly therefrom. The pole 32 is used to mount a suitable light or luminaire 29 at the upper end thereof. The edge portion 33 of the plate 27, opposite from the lug 26 forms a plate-like lip which rests down upon a pair of bosses 34, 34 which are formed in the two corners of the housing 11 adjacent the wall opposite from the hinge member 25.

Figure 1:
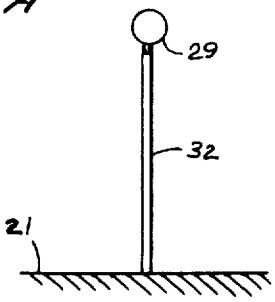
FIG. 1 is a side elevational view of a light pole and light installed on a base made according to the present invention.

The bosses are located so they will bear against the lip portion 33 with the pole 32 upright. An adjusting set screw 35 which has a flat head adapted to engage the lip portion 33 and thereby control the angular position of the hinged support plate 27 about its pivoting or hinged axis is threadably mounted in each of the bosses. This will mean then that the axis 37 of the pole 32 can be adjusted so that it is plumb in the directions as indicated by double arrow 36 in FIG. 1. This adjustment is made by turning the set screws 35 in or out until the axis 37 of the pole 32 is properly oriented in its plane of movement about its hinge axis of pin 30.

In addition, the bosses 34 are drilled and tapped to receive a pair of countersunk head cap screws 38 which pass through provided countersunk openings in the support plate 27 and thus are threaded into the bosses so that the support plate 27 is held locked against the tops of the set screws 35. Then the pole cannot pivot at all about its axis when the cap screws 38 are in place.

Figure 4:
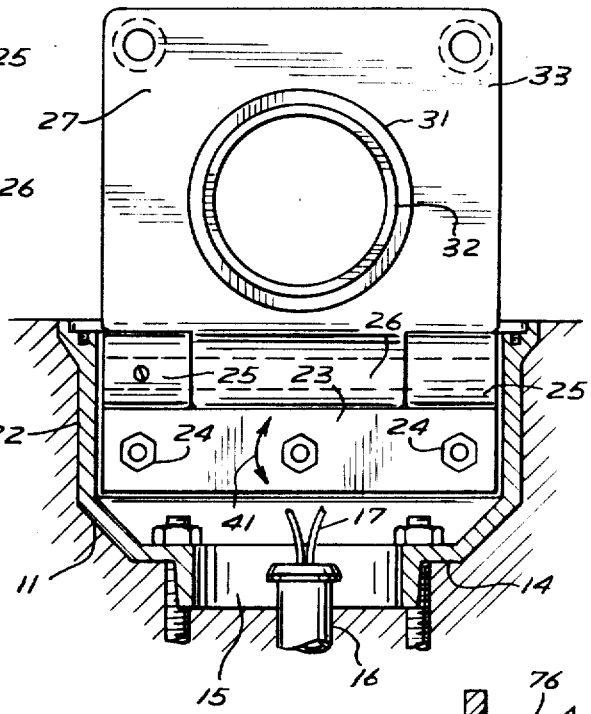
FIG. 4 is a view taken as on line 4—4 in FIG. 2.

The plumbing of the axis 37 of the pole 32 in the plane at right angles from that of its movement about hinge pin 30, is accomplished by adjusting the hinge bracket 23 on bolts 24. Either slightly slotted holes can be provided in the hinge bracket 23 or else just merely oversize holes can be provided so that the bracket can be tilted about its center to insure that the axis of pin 30 is horizontal, thus insuring that the pole axis 37 is vertical in the plane opposite from that of the hinging plane when the pole is upright. In this manner, namely by shifting the bracket 23 in directions as indicated by the double arrow 41 in FIG. 4, the pole can be plumbed in the direction opposite from its hinging plane.

In order to make sure that the housing 11 is completely sealed from the weather, a cover plate 42 is placed over the pole 32 and a gasket 43 is provided around the perimeter whcih fits down over a sealing surface 44 on the flange 20. As can be seen, the flange 20 is recessed to receive this cover plate so that the cover plate is flush with the surface 21 also. In addition, a gasket that tightly grips the pole 32 is provided against the pole. This seals against the top of the hinge plate and the edges defining the center opening in the cover plate 42 around the pole. Thus, the cover plate 42 is sealed in two places, namely by gasket 43 and gasket 45. This completely waterproofs the housing 11 and prevents moisture from entering to get at the wiring. Not only that, it prevents water from filling the housing, freezing, and then cracking the housing.

The wires 17 are connected through the use of connectors 46 to wires 47 extending up into the pole and then to the light at the top of the pole. It can be seen that the bottom of the pole 32 is open through hub 31 into the cavity formed in the housing 11 and the connections can easily be made when the pole is in its lowered position shown in FIG. 2.

Figure 2:
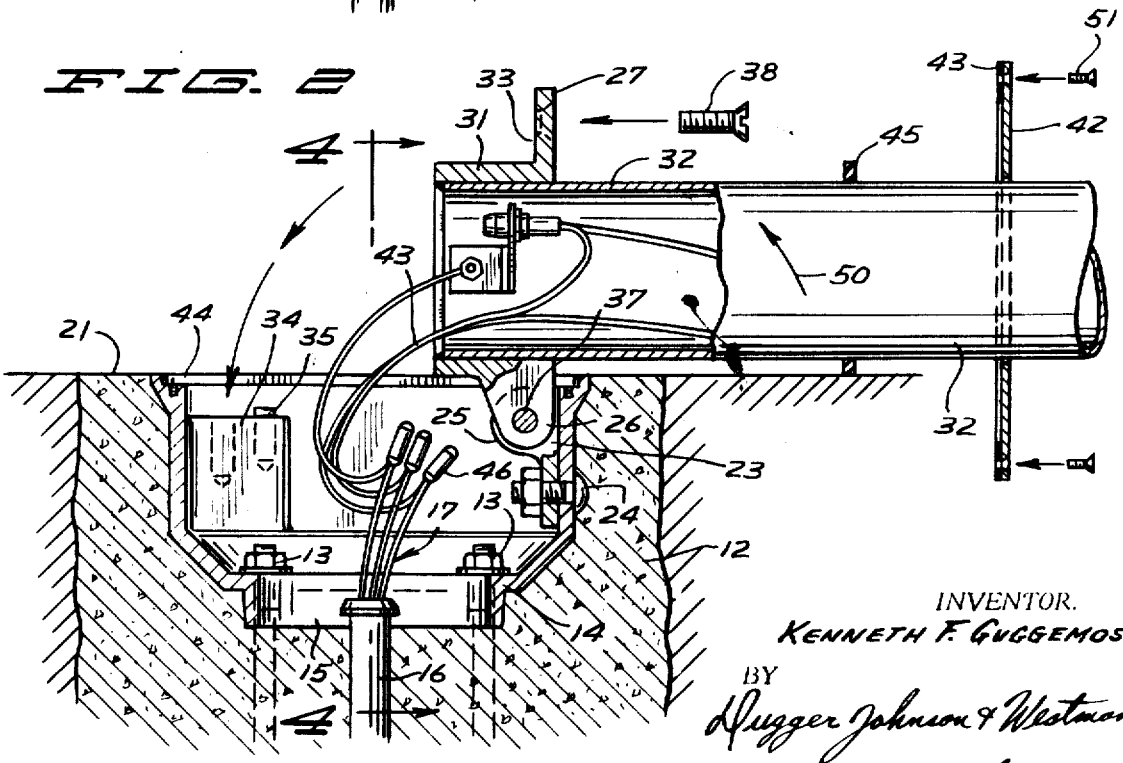
FIG. 2 is a vertical sectional view of the device of FIG. 1 with the lighting standard in a lowered position.
Figure 3:
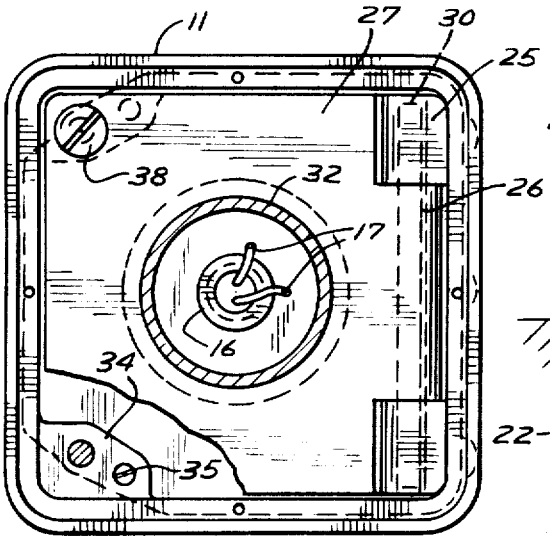
FIG. 3 is a sectional view taken as on line 3—3 of FIG. 1.

As stated previously, when the unit is to be used, the housing 11 is placed into place with the anchor bolts 13 embedded in the wet concrete and then the concrete is allowed to set. The housing is positioned so that the top of the flange 20 is flush with the surface 21. Then the support plate 27 is attached to the pole or standard 32, and the bracket 23 is placed into the inside of the housing 11. The bracket 23 is then adjusted on its bolts 24 so that the axis of the openings through ears 25 is horizontal. The support plate 27 is then put into place and pin 30 is inserted through the ears 25 and lug 26. The pole can be laid down as shown in FIG. 2 when this is done. The wires 17 and 47 are connected. The pole 32 is then raised into position by pivoting the unit in direction as indicated by arrow 50 in FIG. 2. The set screws 35 in lugs 34 will engage the lip portion 33 of the plates 27 and support the plate. By adjusting the set screws 35 to the desired height, the plumbing of the axis 37 of the pole can be accomplished. Once properly adjusted, the support plate will be locked into place through the use of the countersunk head screws 38. The pole will be held very securely and safely.

Then the cover plate 42 is slid down over the pole. The cover plate and gaskets are installed prior to the putting of the base 27 on the pole or are slid down from the top of the pole if possible. The gaskets are put into place, and the cover plate is then held down into the flange 20 with suitable screws 51.

Thus the unit forms a base assembly which will hinge so that the pole can be lowered to position as shown in FIG. 2 for servicing the lights at the top of the pole and which presents a very neat appearance to the outside. The base assembly does not extend above ground surface. It makes the pole actually appear to "grow" out of the surface 21. The cover plate 42 and its associated gaskets will securely seal the unit so that no moisture can get in and short out the wiring or cause other problems.

To lower the pole, the cover plate is removed, slid partially up the pole, screws 38 are removed and the unit is merely hinged downwardly.

Figure 5:
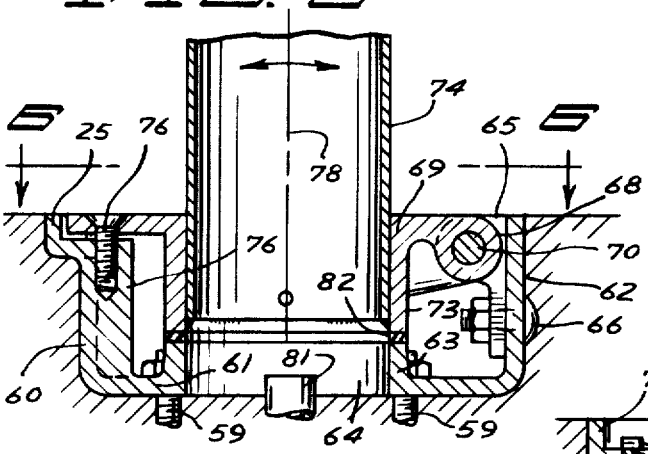
FIG. 5 is a fragmentary vertical sectional view of a hinged base made according to a second form of the invention.
Figure 7:
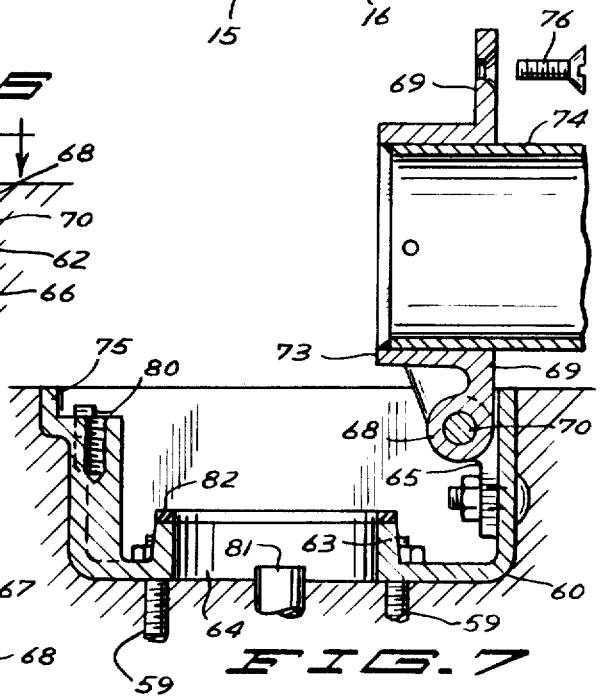
FIG. 7 is a vertical sectional view of the device of FIG. 5 showing it with a lighting standard in a lowered position.
Figure 6:
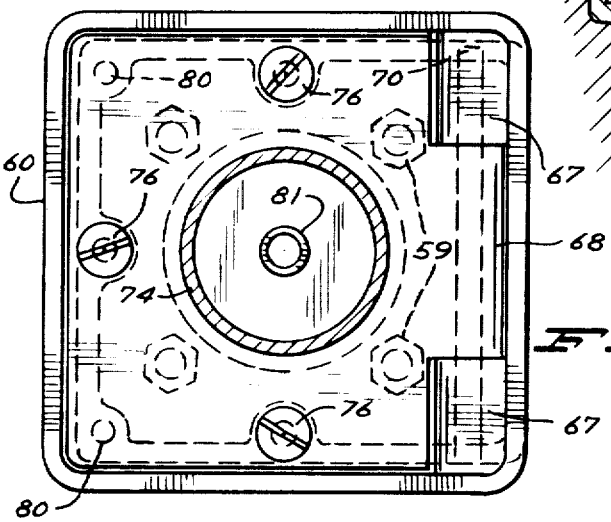
FIG. 6 is a sectional view taken as on line 6—6 in FIG. 5.

In FIGS. 5, 6 and 7 a slightly modified base made according to the present invention is shown. The unit is flush mounted and hinges as well as sealing the interior of the housing against moisture.

As shown in FIG. 5, a housing 60 is formed with a bottom wall 61 and side walls 62. The bottom wall 61 is formed to have a neck 63 extending upwardly therefrom and defining an opening 64. The housing 60 can be mounted into the ground or its foundation with four anchor bolts 59. The anchor bolts also are locked onto the bottom wall with lock nuts so they are held in place prior to installation into the ground. A hinge bracket 65 is bolted with suitable bolts 66 to one of the walls 62. The bracket 65 has a pair of ears 67, 67 which are spaced apart the same way as the ears 25 in the bracket in the first form of the invention. The bolts 66 hold the bracket in place.

The ears 67, 67 are spaced far enough apart to receive a lug 68 of a hinged support plate 69. The lug 68 has an opening, as do the ears 67, 67 and a pin 70 is passed through these openings to hingedly attach the lug between the ears 67. The support plate 69 will move about the axis of the pin 70. The axis of the pin 70 can be moved to a horizontal position by allowing for some clearance in the holes for the bolts 66 in bracket 65 so that the bracket 65 can be cocked slightly thus adjusting the axis of pin 70 with respect to the horizontal.

As can be seen, the hinge plate 69 has a neck or hub 73 of size to receive a pole or standard 74. The pole 74 is welded into place inside the neck. When the pole 74 is in its upright position, as shown in FIG. 5, the hinge plate 69 is positioned within the perimeter of the housing 60. An upper peripheral flange 75 of the housing 60 is recessed to receive the peripheral edges of the support plate 69.

Three countersunk head cap screws 76 are passed through provided openings in the support plate and are threadably mounted to aligning bosses 77 on the edges of the housing 60. This can be seen in FIG. 6 in dotted lines. The support plate 69 can be held in position with respect to the housing through the use of the screws 76. In order to level the support plate and make the axis 78 of the pole 74 vertical, a pair of set screws 80, 80 are threadably mounted in the corners of the housing 60 opposite from the lugs 67. The set screws 80 can be adjusted so that they engage the underside of the support plate 69 to position the pole properly in its plane of movement so that the axis 78 is exactly vertical.

A conduit 81 can extend upwardly from the concrete base in which the housing is mounted into the opening 64 defined by the neck 63 of the housing 60. The conduit 81 can be used for holding electrical wires leading to the base. In order to seal the interior of the opening 64, where the electrical wires are positioned, from the external elements, a thick gasket 82 is mounted around the opening 64 on the upper edge surface of neck 63 and this gasket engages the bottom end surface of the neck 73 of hinge plate 69 when the hinge plate is in position as shown in FIG. 5, with the pole upright. The gasket 82 can be of sufficient resilience and thickness so that the engagement is made easily, even allowing for adjustments to plumb the unit. If the gasket material is sufficiently resilient, these adjustments can be made without losing the seal. The gasket 82 will then insure that any wire coming through conduit 81 will not be subjected to moisture or other detrimental conditions.

The main cavity of the housing 60 can be provided with a suitable drain to permit water to drain off as it enters. However, the gasket 82 will completely shield the wiring or other electrical components in this unit. This second form of the invention is more suitable where freezing temperatures are not a factor. Then there is no problem with water not draining out, freezing and breaking the housing.

The pole 74 can be hinged about the axis of pin 70 to a lowered position as shown in FIG. 7 merely by loosening the three screws 76 and removing them, and then lowering the pole about its hinged axis. The unit can then be raised again and held in place by replacing the screws 76. Gasket 82 is the only gasket utilized but will seal the internal chamber housing the wiring and other critical electrical components, from the elements.

If desired or necessary, suitable ballast and other electrical components can be placed inside the pole 74 adjacent the base and all of these components then will be housed inside the pole and there will be no external members that break the simplicity of design and beauty of installation for the recessed bases. The recessed bases thus provide the advantages of a hinged base and the beauty of a recessed base in one unit and insure that water is excluded from the wiring for the pole. The wires will come up through the base and do not have to be mounted to the exterior.

The utilization of a separate base housing in both forms of the invention greatly simplifies the method of installing the recessed bases. The anchor bolts are preassembled onto the housing, without the hinge bracket in place. The bolts for the hinge bracket are installed however. Then the housing and the anchor bolts are positioned so that the center opening surrounds the electric conduit, which must be positioned before the foundation concrete is poured. The concrete is poured around the anchor bolts and housing and the final adjustment for depth of the housing is made. Then the hinge bracket and pole support plate, together with the pole, can be attached to the housing, after the foundation concrete has cured.

Previously, with above grade installations, the position of the anchor bolts was quite a problem. Not only were they incorrectly placed with respect to each other, but they would also be improperly positioned in relation to the electric conduit. Then, too, they were easily damaged because they protruded above grade—they would get run over and bent or the threads damaged. Another problem was getting concrete in the threads. The above grade bases were installed after the concrete had set. Time and effort were required.

In the prior devices, a template for locating the anchor bolts was used, but not completely successfully. The housings of the present invention arrive at the job site before the poles arrive and they are cemented in before the pole arrives. There is no need for shims or temporary supports. The housings are installed with the top edge at grade and then leveled easily. Final adjustments for plumbing the pole are made after the hinge bracket is installed.

With the anchor bolts held in the housing the installation is greatly simplified.

What is claimed is:

1. A base mounting a lighting [standard] *support pole* on a supporting surface comprising a housing mounted with the major portion thereof below the supporting surface, *said housing having a top opening,* first means to anchor said housing securely with respect to the supporting surface, *second means to hingedly mount the pole on the housing and close the housing opening at an elevation generally flush with said supporting surface, the second means including* a support [plate] *member having a first edge portion and an opposite second edge portion,* said support [plate] *member* having a light support pole attached thereto and extending outwardly therefrom, *third* means to hingedly attach said [plate] *support member* to the housing, *the third means being attached to the first edge portion,* said support [plate] *member* being hingedly movable from a position wherein said pole is upright to a lowered position, and *fourth* means *coacting with the second edge portion* to hold said [plate] *support member* with respect to said housing when said pole is in its upright position, said [support plate] *second means* having an upper surface that is substantially flush with the supporting surface when the pole is upright.

2. The combination as specified in claim 1 and means in said housing defining an interior chamber through which electrical wires may pass into the interior of said pole, and gasket means to seal the interior chamber from the atmosphere.

3. The combination as specified in claim [1] *2* wherein *the second means includes* a separate cover plate [is placed over] *above* said support [plate] *member* with the pole in its upright position, *said cover plate having said upper surface,* and said gasket means is positioned between the support [plate] *member* and said cover plate and surrounding said pole and between the cover plate and the upper edge of said housing, and means to fasten said cover plate to the housing.

4. The combination as specified in claim 1 [and] *wherein the housing has a wall and the third means includes* a hinged bracket *attached* to [hingedly attach] said support [plate to said housing, the use of a hinge bracket] *member* and means to attach said hinge bracket to [a] *the* wall [of the housing] so that the hinge bracket is adjustable to permit changing the axis of pivot of the hinge *bracket* with respect to the horizontal.

5. The combination as specified in claim 4 and a pair of stop set screws threadedly mounted to said housing and extending upwardly to engage said support [plate] *member* when the support [plate] *member* is in position with the pole standing upright.

6. The combination as specified in claim 2 wherein *said housing has a bottom wall and* said chamber is defined by a cylindrical neck extending upwardly from [a] *the* bottom wall of the housing, and a second cylindrical neck extending downwardly from said support [plate] *member* and overlying said first cylindrical neck, and wherein said gasket means is positioned between and resiliently engages the edge surfaces defining said necks.

7. A method of installing a hinged light pole base having a support housing and an attachable hinged plate and pole assembly in a poured cementation foundation comprising the steps of:

attaching elongated anchor bolts securely to the housing so as to protrude therefrom in proper anchoring direction;

placing the support housing in its desired location;

pouring the foundation material in surrounding relationship to the anchor bolts until the upper edge of the housing is substantially flush with the surface of the surrounding foundation material and permitting the foundation material to harden; and attaching the hinged plate and pole assembly to the housing.

8. The method of claim 7 including the further step of leveling the housing at grade prior to pouring the foundation.

9. The method of claim 7 including further step of adjusting the hinge axis of the hinged plate and pole assembly to be horizontal.

10. In a lighting pole base for mounting into the ground with the top of the base substantially grade level, and with a hingeable pole attached to the base, the improvement comprising a housing, a plurality of anchor means mounted on said housing to make a subassembly, means to secure said anchor means with the major portion of the housing below grade level, a support plate, hinge means to attach said support plate to the housing, said hinge means being attachable to the housing after the housing is secured at grade level, and a light support pole and light attached to said support plate, said support plate being substantially at grade level when said light support pole is in an upright position [.], *said support plate having an edge portion remote from the hinge means, and means for securing the support plate to the*

*housing to releasably retain the support plate in a position that the light support pole is upright.*

*11. The combination as specified in claim 1 wherein said suppport member comprises a support plate having said upper surface and has the pole attached thereto.*

*12. The combination as specified in claim 11 wherein said housing has an interior chamber and that there is provided gasket means to seal the interior chamber from the atmosphere.*

References Cited

The following references, cited by the Examiner, are of record in the patented file of this patent or the original patent.

UNITED STATES PATENTS

| | | | |
|---|---|---|---|
| 1,338,028 | 4/1920 | Linehan | 40—145 |
| 3,141,620 | 7/1964 | Guggemos | 240—84 |
| 3,311,333 | 3/1967 | Galloway | 52—298 |

FOREIGN PATENTS

| | | |
|---|---|---|
| 273,772 | 1913 | Germany. |

JOHN E. MURTAGH, Primary Examiner

U.S. Cl. X.R.

52—28, 291, 298; 240—84